United States Patent
Shiraishi et al.

(10) Patent No.: US 7,088,906 B1
(45) Date of Patent: Aug. 8, 2006

(54) INFORMATION REPRODUCING APPARATUS

(75) Inventors: Yoshiki Shiraishi, Saitama (JP); Morio Araki, Saitama (JP); Mitsuo Shoji, Saitama (JP); Tadateru Honda, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/549,592

(22) Filed: Apr. 14, 2000

(30) Foreign Application Priority Data

Apr. 16, 1999 (JP) ............................. 11-109107

(51) Int. Cl.
*H04N 9/79* (2006.01)
(52) U.S. Cl. .......................................... 386/35; 386/46
(58) Field of Classification Search ............. 386/47, 386/68, 95, 124, 125, 126, 35, 46, 8, 120, 386/83
See application file for complete search history.

(56) References Cited

U.S. PATENT DOCUMENTS

| 4,680,647 A | * | 7/1987 | Moriyama | .................. 386/112 |
| 5,146,407 A | | 9/1992 | Motohashi | |
| 5,408,686 A | * | 4/1995 | Mankovitz | ............... 369/47.23 |
| 5,526,065 A | | 6/1996 | Todoriki | |
| 5,541,572 A | | 7/1996 | Okamoto et al. | |
| 6,208,802 B1 | * | 3/2001 | Mori et al. | .................... 386/96 |
| 6,493,506 B1 | * | 12/2002 | Schoner et al. | .............. 386/126 |

FOREIGN PATENT DOCUMENTS

| EP | 0 886 276 A2 | 12/1998 |
| EP | 0 886 277 A2 | 12/1998 |
| EP | 0 898 279 A2 | 2/1999 |
| WO | 99/58935 | 11/1999 |

* cited by examiner

*Primary Examiner*—James J. Groody
*Assistant Examiner*—James A. Fletcher
(74) *Attorney, Agent, or Firm*—Sughrue Mion, PLLC

(57) ABSTRACT

In an information reproducing apparatus, when a car is travelling, it is inhibited that the image information played back by a DVD reproducing apparatus is displayed on a display device, or the map information outputted from a navigation system is displayed. Further, when the control information for the play back control is recorded in an information medium played back by the DVD reproducing apparatus, even when the car is travelling, the operation state of the DVD reproducing apparatus according to the control information is displayed on the display device by the superimposition display.

5 Claims, 6 Drawing Sheets

INFORMATION REPRODUCING APPARATUS

BACKGROUND OF THE INVENTION

1. Field of the Invention

The present invention relates to an information reproducing apparatus, and for example, to an information reproducing apparatus, in which, even when a display of the display information is inhibited or stopped, the play back state or the control information concerning the display information is effectively displayed. Further, the present invention relates to an information reproducing apparatus for use in a car.

2. Description of the Related Art

Conventionally, as this kind of an apparatus, a car image display apparatus disclosed in Japanese Patent Registration No. 15 2654405 is known. This car image display apparatus detects a car travelling state. While the car is stopped, the image display is allowed. While the car is travelling, the image display is inhibited, and thus, safety is improved.

The conventional automobile equipment described above inhibits the display of moving images while the automobile is in motion, allowing the driver to concentrate on the safe operation of the automobile.

However, because the information source becomes diverse, or the information medium which displays the image information in various forms, appears on the market, there is a case in which inconvenience occurs for the driver or a fellow passenger when the image display is merely inhibited during car travelling.

For example, as the information source to provide the image information, a TV tuner, CD (Compact Disc) play back apparatus, DVD (Digital Video Disk or Digital Versatile Disk) play back apparatus, or navigation system which receives the radio wave from the GPS satellite and displays the present travelling position by the map, are combined with each other, and according to this, the high faculty car equipment is structured. For the CD or DVD as the information media, the CD or DVD having the logical data structure by which the interactive editing can be made, becomes many, therefore, the information medium to which the editing or working to display the image information by various display forms is previously made by the producer, is increased.

As described above, because the diversification of the information source and the information medium is promoted, on the display apparatus of the car equipment, the image information is displayed by the various display forms which are intended by the producer side who made the information medium.

As a result, for example, when the driver or the fellow passenger looks the image (movies, or the like) of DVD during the stoppage of travelling, and starts travelling, the DVD apparatus continues the play back operation, however, because the image display by the display apparatus is inhibited, the driver or the fellow passenger can not confirm the state of the play back of the DVD during the inhibited period.

In a more concrete case, when the image display is inhibited during the play back of the moving picture, because the audio play is continued, the driver or the like can confirm that the DVD reproducing apparatus is on play back operation, by listening the sound from the speaker. However, when the still image play back, which was previously edited by the DVD producer, is conducted during the inhibited period of the image display, the audio play back is also stopped.

Accordingly, while the still image is played back, the driver or the like can not easily obtain the judgement information whether the play back operation of the information source (DVD apparatus or the like) is stopped, whether the play back is normally continued, or whether, although the play back is normally continued, because the still image is on the play back, it looks apparently as if the play back operation were stopped, and there is a problem that the situation, in which it can not be easily judged how the driver copes with the inhibition of the image display, is assumed.

The same problem exists in, not limited to the information reproducing apparatus for the car use, but also other uses such as the home use information reproducing apparatus. For example, an AV equipment such as the DVD reproducing apparatus, can be connected to a personal computer, which is rapidly spread, and the diversification such as the case in which, while the movie played back by the DVD reproducing apparatus is displayed on a monitor of the personal computer, the document is simultaneously formed by the personal computer, is advanced.

In such a case, when the display on the image plane is changed to the display of the document formation on the way of watching the movie, the operation state of the DVD reproducing apparatus is not displayed on the monitor. Therefore, there is a problem in which the user is put in the same circumstance as in the car equipment, and can not confirm the operation state and the play back state of the DVD reproducing apparatus, and the inconvenient situation occurs.

SUMMARY OF THE INVENTION

The present invention has been made in view of the foregoing conventional problems, and an object of the present invention is to provide an information reproducing apparatus provided with a means for effectively reporting some information, even when the display of the information is inhibited or stopped.

In order to attain the above object, according to the invention, there is provided an information reproducing apparatus which plays back an information medium in which at least image information and control information to control a play back form of the image information are recorded, comprising: control means for playing back and controlling the image information in a display form according to the control information, and for reporting the play back control state, when the control information is detected at the time of play back of the information medium.

DETAILED DESCRIPTION OF THE PREFERRED EMBODIMENT

Figure 1:
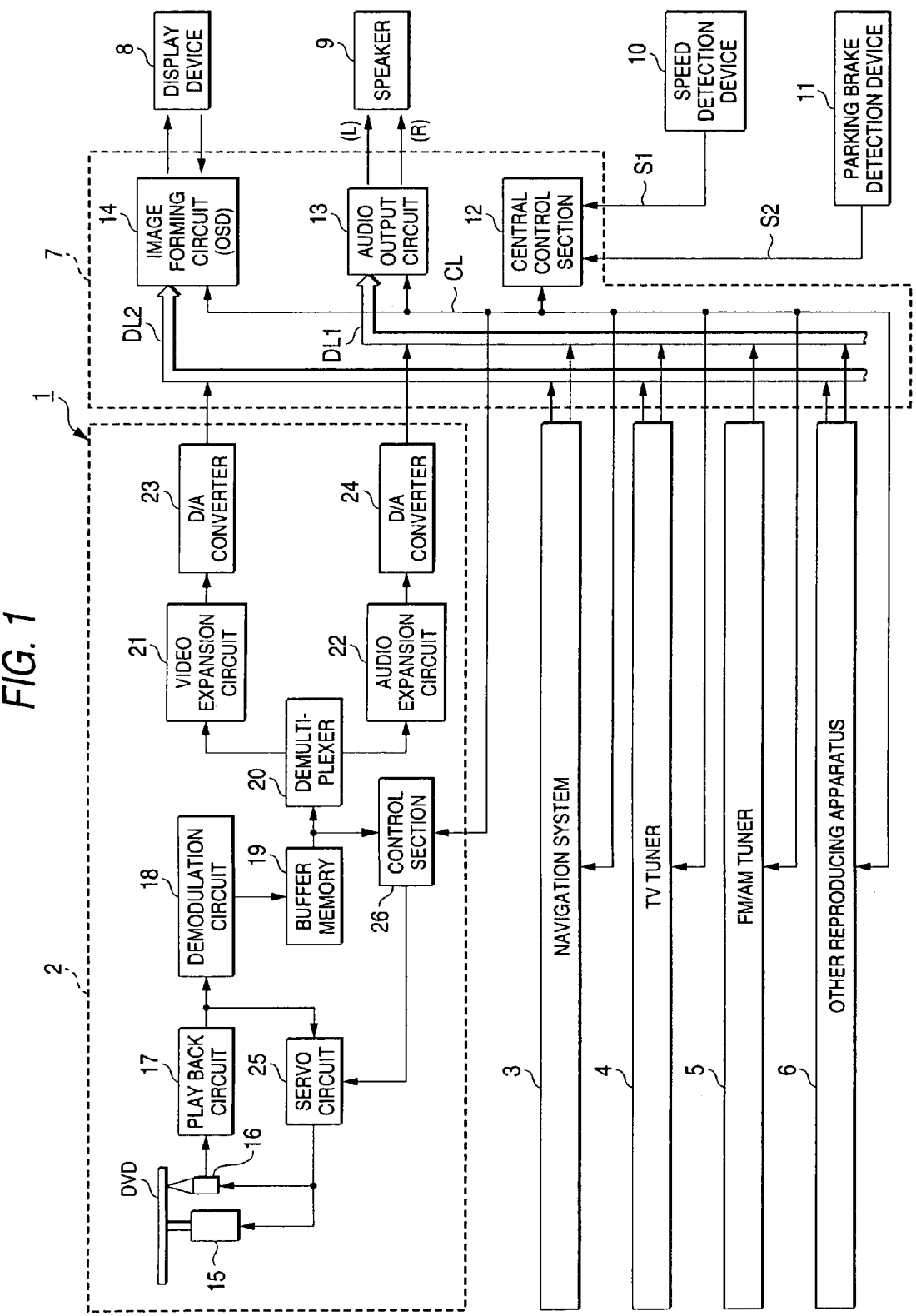
FIG. 1 is a block diagram showing the structure of an image reproducing apparatus of the present embodiment.

Hereinafter, referring to the drawings, an embodiment of the present invention will be described. FIG. 1 is a block diagram showing the structure of an information reproducing apparatus of the present embodiment. Incidentally, as an embodiment, the information reproducing apparatus 1 for car use will be described.

In FIG. 1, this information reproducing apparatus 1 has: a DVD reproducing apparatus 2; a navigation system 3 which receives the radio wave from the GPS satellite and displays the present travelling position by a map; a TV tuner 4 which receives the television broadcast; an FM/AM tuner 5 which receives the FM/AM broadcast; and the other reproducing apparatus 6 such as a CD reproducing apparatus or MD (Mini Disc) reproducing apparatus, or the like, and is structured so that these are selectively combined corresponding to the user's desire, and the system-up can be made.

Further, a control system 7 to collectively control these apparatus 2 to 6 is provided in this information reproducing apparatus 1, and the control system 7 respectively supplies a video signal and an audio signal outputted from the apparatus 2 to 6, to a display device 8 such as a liquid crystal display, and an audio speaker 9, and the detection signals from a speed detection device 10 and a parking brake detection device 11, which are provided to the car, are inputted into the control system 7.

Herein, the speed detection device 10 is provided with a sensor function to detect the travelling speed of the car, and outputs a detection signal S1 showing on-stoppage and on-travelling of the car. Further, the parking brake detection device 11 is provided with a sensor function to detect the operation state of the parking brake such as a side brake provided in the car, and outputs a detection signal S2 showing that the car is stopped.

The control system 7 is provided with a central control section 12 having a micro processor (MPU) to control the overall operation of this information reproducing apparatus 1, by carrying out a previously set system program, and an audio output circuit 13, and an image forming circuit 14.

The audio output circuit 13 is connected to the central control section 12 through a control signal line CL, and is connected to each of the above apparatus 2 to 4, and 6 through an audio signal line DL1. Then, the audio signals supplied from each of apparatus 2 to 4 and 6 are supplied to the audio speaker 9 according to the control signal from the central control section 12.

The image forming circuit 14 is connected to the central control section 12 through the control signal line CL, and connected to each of the above apparatus 2 to 6 through a video signal line DL2. Then, the video signals supplied from each of apparatus 2 to 6 are supplied to the display device 8 according to the control signal from the central control section 12.

Further, the image forming circuit 14 houses therein, together with a circuit to display operation buttons on the display image plane of the display device 8 (hereinafter, referred to as OSD display circuit), a touch panel type detection circuit to detect that the operator touches the image plane of the operation button display, and transfers the detection signal expressing the contact information to the central control section 12 through the control signal line CL.

The above OSD display circuit has a function to display the operation states of each of apparatus 2 to 6 and so-called menu information on the display image plane of the display device 8 in the display form with good visibility. Incidentally, these information is stored in a read only memory (ROM), which is previously provided in the image forming circuit 14, as the image data, and the OSD display circuit makes memory-access to the predetermined image data according to the direction of the central control section 12, and supplies it to the display device 8.

According to such a structure, the image forming circuit 14 makes the display device 8 display the image according to the video signal from each of the apparatus 2 to 6, and further, makes the menu display displayed by being superimposed on the played back image, or makes the driver or a fellow passenger operate a predetermined operation by making them operate the above operation button display, or displays the effective information for the driver during the travelling regulation, which will be described later.

Next, as an typical example, the structure in the case where a DVD reproducing apparatus 2 is combined with this apparatus, will be described in more detail.

The DVD reproducing apparatus 2 is provided with: a loading mechanism (not shown) to carry the DVD which is an information medium, into a predetermined clamp position, or to carry it out of the clamp position; a spindle motor 15 to rotate the DVD which is carried into the clamp position, at a constant linear velocity (CLV; Constant Linear Velocity); and a pick-up 16 to optically read out the recording information of the DVD. Further, the DVD reproducing apparatus 2 is structure in such a manner that: the recording data which is read out by the pick-up 16 is converted into the data which can be signal-processed, by the play back circuit 17; and demodulated by the demodulation circuit 18; and the video data in the recording data which is time-division-multiplexed is separated and supplied to a video expanding circuit 21, and the audio data in the recording data is separated and supplied to an audio expanding circuit 22, through a buffer memory 19 and a demultiplexer 20.

The video data which is expansion-processed by the video expanding circuit 21, is converted into an analog video signal by a D/A converter 23, and is supplied to an image forming circuit 14 through a video signal line DL2, and the audio data which is expansion-processed by the audio expanding circuit 22 is converted into an analog audio signal by a D/A converter 24, and is supplied to an audio output circuit 13 through an audio signal line DL1.

Further, the DVD reproducing apparatus 2 is provided with a servo circuit 25 to servo control a spindle motor 15 and a pick-up 16 according to a tracking error signal outputted from the play back circuit 17, and a control section 26 having a microprocessor to control the overall operations of the DVD reproducing apparatus 2. The control section 26 is connected to also the central control section 12 of the control system 7 though the control signal line CL, and according to the direction from the central control section 12, conducts an appropriate synchronous play back.

Herein, the buffer memory 19 temporarily holds the recording data from the demodulation circuit 18 and the navigation data (which will be detailed later), video data which is the video information, and audio data which is the audio information, included in the recording data which is time-division-multiplexed at that time, are separated, and the navigation data is outputted to the control section 26, and the video data and the audio data are outputted to the demultiplexer 20.

That is, in the DVD which is the information medium, in order to make the interactive editing piossible, a logical data structure in which the video data and the audio data are not recorded in the recording track as a continuous stream, but in which random recording can be made under a predetermined condition, is adopted (standardization), and further, as the control information to reproduce the read video data and audio data as a continuous stream, the navigation data is previously recorded.

Accordingly, from the demodulation circuit 18, the video data and the audio data are outputted at random, and when the image play back and the audio play back are conducted at the data arrangement as it is, the original image and the audio information are not restored.

Accordingly, by obtaining the navigation data and controlling the input and output timing of the buffer memory 19 according to the navigation data, the control section 26 rearranges the random video data and audio data as the restorable continuous stream and output it.

Further, the demultiplexer 20 separates (demultiplexes) the video data and the audio data from the buffer memory 19 according to the synchronous timing directed by the control section 26 according to the navigation data, and supplies them to the video expansion circuit 21 and the audio signal circuit 22.

The video expansion circuit 21 expands the video data which is data-compressed, to the video data on the original time axis, and the audio expansion circuit 22 expands the audio data which is data-compressed, to the audio data on the original time axis.

Incidentally, in the DVD standard, because the video data is data-compressed according to the MPEG2 (Moving Picture Experts Group 2) and the video format (ISO 13818-2), the audio expansion circuit 22 conducts expansion processing corresponding to this.

Further, in the DVD standards of the audio data, 3 systems of the linear PCM, AC-3, and MPEG, are allowed, and the information by which system the audio data is recorded, is shown by the navigation data. Accordingly, in the audio expansion circuit 22, according to the system directed by the control section 26 according to the navigation data, the audio data which is data-compressed, is appropriately expansion-processed.

Further, in the navigation data, not only the data concerning the arrangement of the video data and the audio data, and the data concerning the compression system, exists, but also the programmable control data to make the interactive play back possible is standardized. The DVD producer can previously edit various play back methods by using these control data.

For example, as the programmable control data, the initial play back data by which, when the user such as the driver, or the like, loads the DVD into the DVD reproducing apparatus 2, even when the play back start button (play button) is not pressed, the play back can start automatically, the stop command data by which the play back operation of the DVD reproducing apparatus 2 can be automatically stopped at the time point which is intended by the DVD producer, and the still control data to switch to the still image play back (still play back) during the moving picture play back, and the like, can be previously recorded.

Incidentally, in the still control data, the temporary still control data by which the specific frame image is changed to the still image play back for a time period which is intended by the DVD producer during the moving picture play back and after that time, the still image play back can be automatically returned to the moving picture play back, and the fixed still control data by which, when the moving picture play back is switched to the still image play back, it is fixed at the still image play back state until the direction of the start of the moving picture play back is given by the use, exist.

Figure 2:
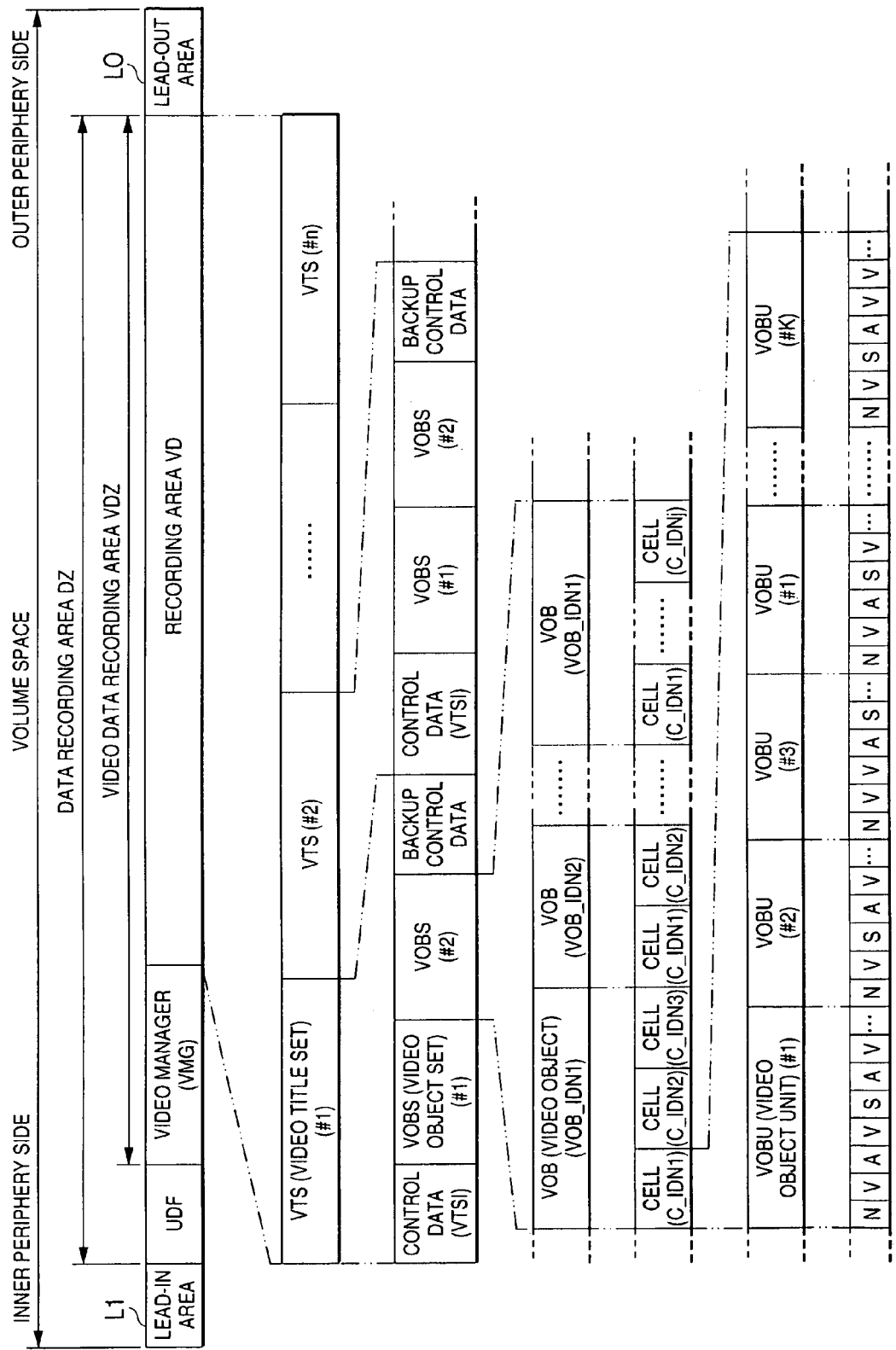
FIG. 2 is an illustration showing the logical data structure of a DVD which is an information medium.

Next, referring to FIG. 2, the logical data structure of the DVD in which these programmable control data are previously recorded, will be outlined.

In FIG. 2, as shown in the uppermost stage in the drawing, in the volume space of the DVD, a read-in area LI on the inner periphery side, and a read-out area LO on the outer periphery side, and a data recording area DZ provided between these read-in area LI and read-out area LO, are provided. The data recording area DZ consists of a recording area UDF in which UDF (Universal Disk Format) showing the relationship of the physical address and the logical address, is recorded, and a video data recording area VDZ.

Further, the video data recording area VDZ consists of a video manager recording area VMG, and a recording area VD to record the video data and the audio data which are play back data.

In the video data recording area VDZ, each data is recorded as the set of a set unit, cell unit, pack unit, etc, according to a predetermined hierarchization structure.

The data recorded in the data recording area DZ consists of, largely divided, the navigation data and the presentation data serving as the play back data.

The presentation data is structured, as shown in the lowermost stage in the drawing, by the set of a video pack V (Video Pack) composed of the video data compressed by the MPEG2 video format, an audio pack A (Audio Pack) composed of the audio data compressed by the above 3 methods, and a sub-picture pack S (Sub-picture Pack).

Incidentally, a sub-picture pack S is the data compressed by the run-length compression coding to enable a superimposed caption, or menu, words of Karaoke, etc., to be displayed by the superimposition, and a navi-pack N consists of the play back control information (PCI) and the data search information (DSI). The play back control information (PCI) is used for determining the play back information according to the state of the presentation, and the data search information (DSI) has the information concerning the normal quick forwarding play back, the reversal quick rewinding play back and the continuous play back.

Then, the presentation data is structured by the bit-stream which is multiplexed for each pack unit, by respectively making the video pack V, audio pack A and sub-picture pack S the set of a plurality of pack units.

Further, the unit of—composed by adding the navi-pack N to the video pack V, the audio pack A and the sub-picture pack S, is called a video object unit (VOBU).

As the most significant recording unit, a video title set (VTS: Video Title Set) is determined, and a plurality of video title sets VTS (#1) to VTS (#n) can be recorded.

Respective video title set (VTS) is structured by the set of the video title set information (VTSI: Video Title Set Information), more than one or two video object set (VOBS: Video Object Set), and the back-up control data having the same content as the video title set information (VTSI), and further, respective video object set (VOBS) is structured as the set of more than one or two video object (VOB: Video Object).

Incidentally, by adding an ID number (V_ID1 to V_IDi) to each video object (VOB), the identification can be made.

Further, each video object (VOB) is structured by the set of more than one or two cells (Cell), and each cell (Cell) is structured by more than one or two video object units (VOBU: Video Object Unit). Incidentally, by adding the ID number (C_ID1 to C—IDj) to also each cell, the identification can be made.

The navigation data has the control information necessary for the attribute (attribute) and play back of the presentation data, and a plurality of types are provided.

Concretely, as the navigation data, the video manager information (VMGI), the video title set information (VTSI), the program chain information (PGCI), the play back control information (PCI), and the data search information (DSI) exist.

Herein, the video manager information (VMGI) is the control data to play back the video title sets VTS (#1) to VTS (#n), and is recorded in the video manager recording area (VMG) together with the program chain information (PGCI). Further, the program chain information (PGCI) is recorded in the forefront of each video title set (VTS) included in the video title set information (VTSI).

The program chain information (PGCI) is the information concerning the play back sequence of the presentation data having the video pack V, audio pack A, and sub-picture pack S, and is recorded as the information of the sequence of the cell (Cell).

Further, the above initial playback data, stop command data, pause command data, still control data, etc., are also recorded being included in the program chain information (PGCI).

At the time of the play back, these navigation data are played back together with the navigation data, and according to the navigation data, the presentation data is restored (demodulate, expand, etc.) to the original video data and audio data, or its play back image is displayed in the display form intended by the producer.

Next, the case in which the navigation system 3 is combined, will be described. The navigation system 3 receives the radio wave from the GPS satellite and detects the present travelling position, and supplies the information of the present travelling position to an image forming circuit 14 and an audio output circuit 13 in the control system 7, together with the map information and the audio information recorded in the CD-ROM, or the like. Then, the image forming circuit 14 displays the map information and the information of the present travelling position on the display device 8 in the various display forms, and the audio output circuit 13 supplies the audio information to the speaker 9.

Further, also when the TV tuner 4, FM/AM tuner 5, and other play back apparatus 6 are combined with each other, the video information or the audio information is supplied to the display device 8 or the speaker 9 through the control system 7.

Figure 3:
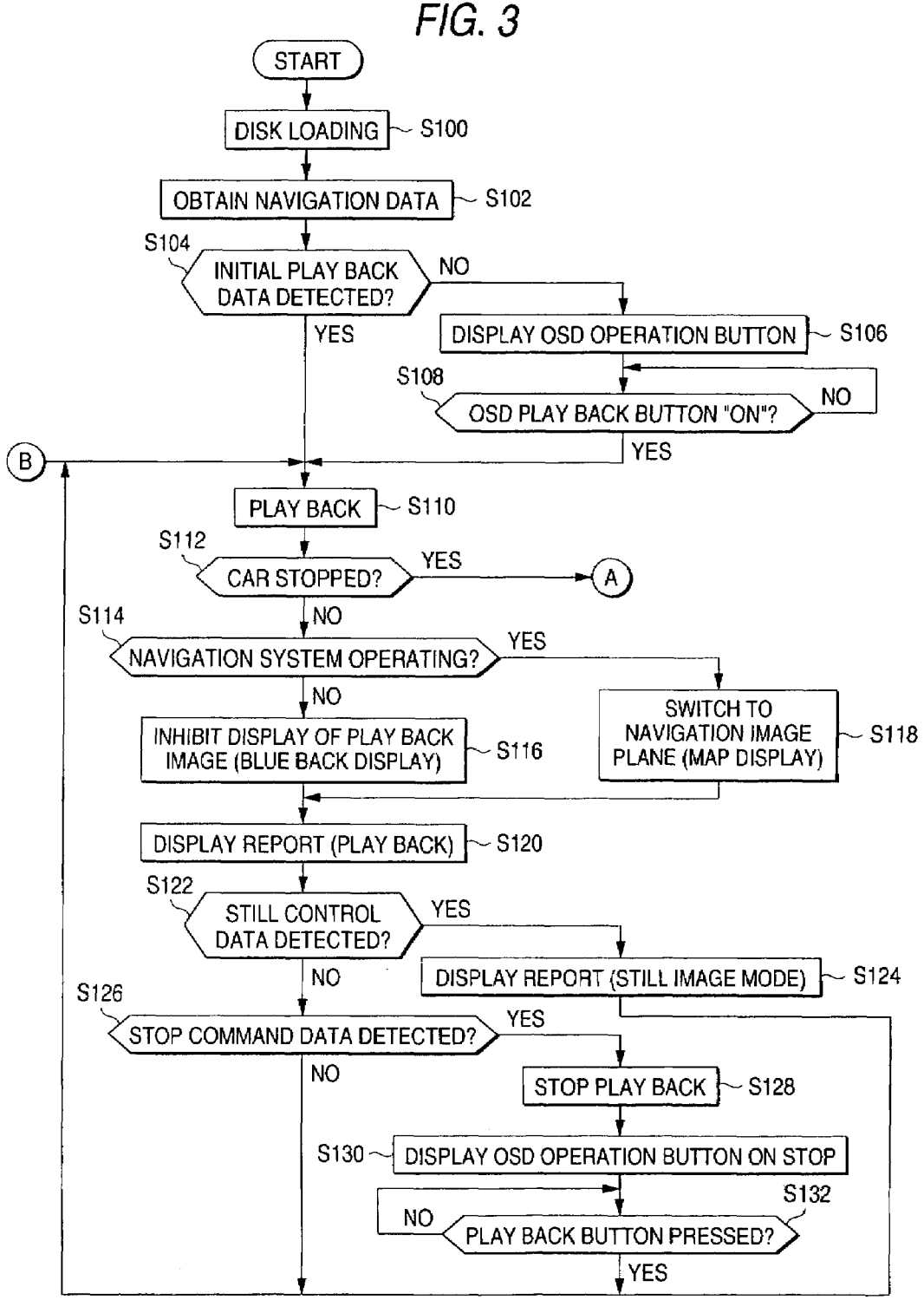
FIG. 3 is a flow chart for explaining an operation of the image reproducing apparatus of the present embodiment.
Figure 4:
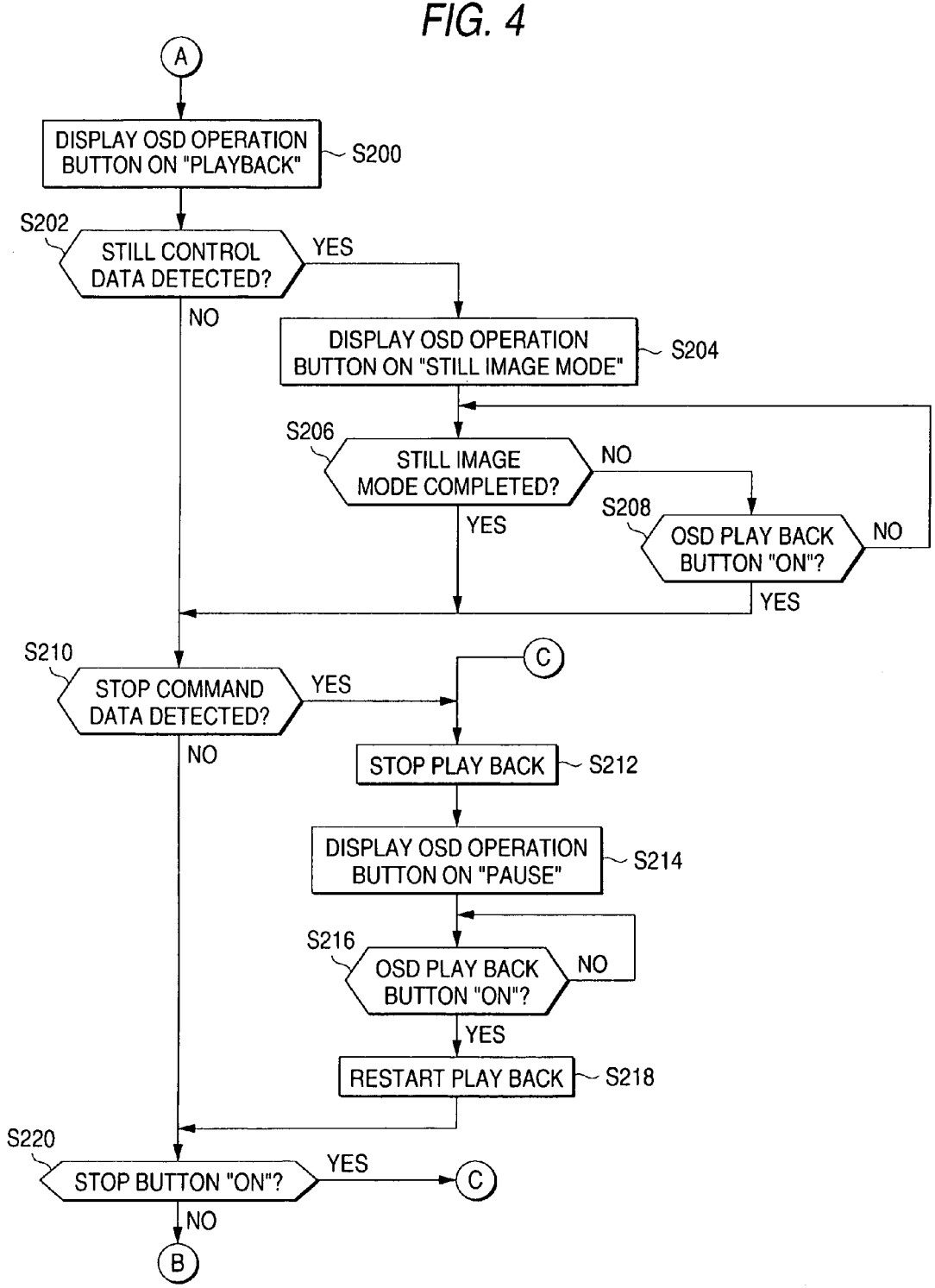
FIG. 4 is a flow chart for further explaining an operation of the image reproducing apparatus of the present embodiment.

Next, referring to FIG. 3 to FIG. 6(c), the operations of the present information reproducing apparatus 1 having such a structure will be described. FIG. 3 and FIG. 4 are flow charts for explaining the operations under the control of the central control section 12, FIGS. 5(a) to 5(c) and FIGS. 6(a) to 6(c) are illustrations showing the information displayed on the display device 8 as an example. Further, as the typical example of operations, the case where the user who is a driver, operates the DVD reproducing apparatus 2 and the navigation system 3, will be described.

In FIG. 3, when the driver inserts the DVD which is the information medium, into the DVD reproducing apparatus 2, the DVD apparatus 2 conducts loading the DVD (step S100), and plays back the navigation data recorded in the video manager recording area VMG and obtains it (step S102).

Next, the central control section 12 judges whether the "initial play back data" is included in the navigation data transferred from the control section 26 in the DVD reproducing apparatus 2 (step S104). That is, the central control section 12 judges whether the "initial play back data" to direct the automatic playback start of the video data or the audio data exits or not.

Herein, when the "initial play back data" exists (the case of "yes"), the central control section 12 makes the DVD reproducing apparatus start the automatic play back, and further, makes the image forming circuit 14 and the audio output circuit 13 process the video signal and the audio signal outputted from the DVD reproducing apparatus 2 (step S110).

On the one hand, when the "initial play back data" does not exist (the case of "NO"), the DVD reproducing apparatus 2 is in the state of play back stop, and the central control section 12 makes the image forming circuit 14 display OSD which means the stop of play back (step S106). According to this, as shown in FIG. 6(b), on the image plane 8a of the display device 8, the OSD operation button displays "PLAY BACK", "STOP", "REWIND", "FAST FEED" are displayed to demand the operations of the driver.

Then, the driver touches the OSD operation button of "PLAY BACK" displayed on the image plane 8a, the touch panel type detection circuit in the image forming circuit 14 detects the touch, and informs the touch information to the central control section 12. When the central control section 12 receives the touch information (step S108), the sequence moves to step S110, and the central control section 12 makes the DVD reproducing apparatus 2, the image forming circuit 14 and the audio output circuit 13, start the play back operation.

Next, the central control section 12 judges the car is in stoppage or not, according to the detection signal from the speed detection device 10 and the parking brake detection device 11 (step S112).

Herein, when the car is in stoppage, the sequence moves to the processing after step S200 shown in FIG. 4, and when the car is travelling (the case of "NO"), the sequence moves to the processing of step S114, the central control section 12 judges whether the navigation system 3 is operating or not.

When the navigation system 3 is not operating, the central control section 12 directs the image forming circuit 14 to switch the image plane of the display device 8 to a blue back display (step S116). That is, when the car is travelling, the overall image plane 8a of the display device 8 is made the blue display, thereby, the DVD image display is inhibited, and according to that, the safety driving of the driver is secured.

On the one hand, when the navigation system 3 is operating, the image display of the DVD which is displayed on priority basis according to the direction of the driver until now, is inhibited, and instead of that, the image plane 8a of the display device 8 is switched to the navigation image plane, and the map information is displayed according to the video signal outputted from the navigation system 3.

Incidentally, it is not against the travel regulation that the map information is displayed according to the video signal from the navigation system 3. Accordingly, in consideration of an increase of facilities of the driver, the display is automatically switched to the display of the map information.

Figure 5:
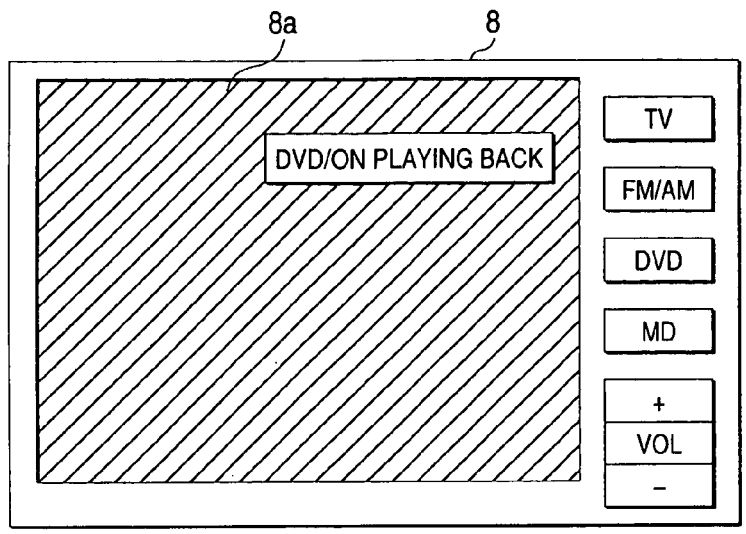
FIGS. 5(*a*) to 5(*c*) are illustrations showing the content of an OSD display displayed on a display device during the car travelling.
Figure 5:
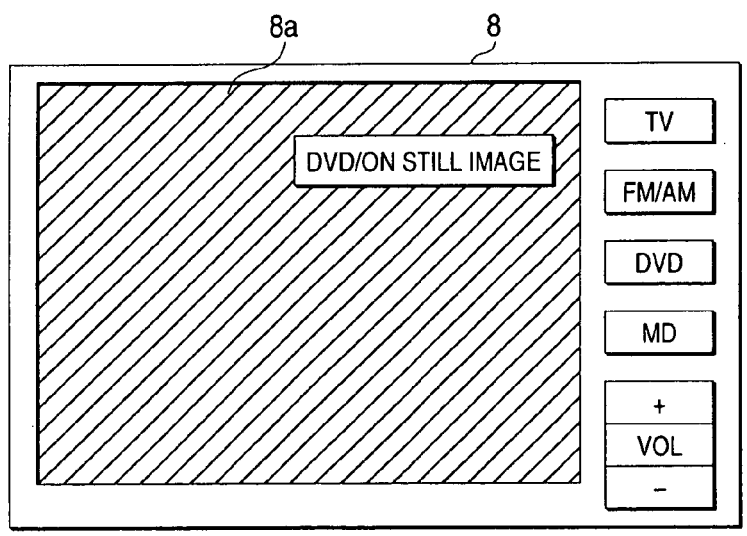
Figure 5:
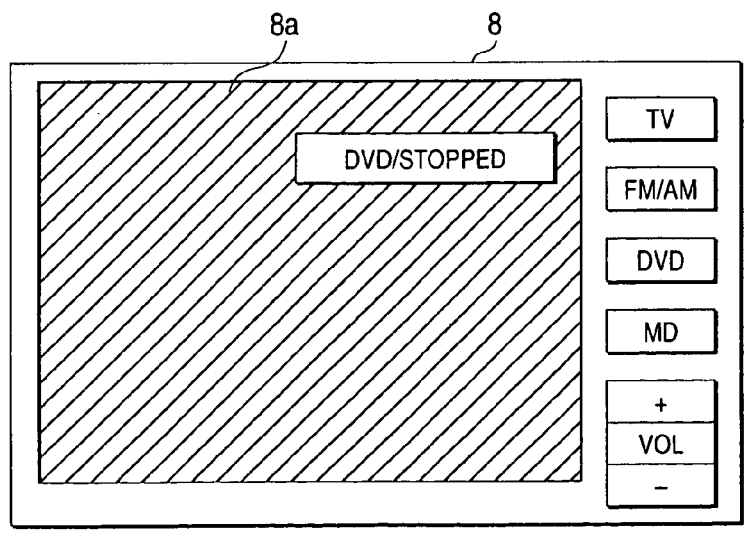

Next, in step S120, the OSD display circuit in the image forming circuit 14 conducts superimposition display to report that the DVD image display is inhibited according to the travel regulation, on a portion of image plane of the display device 8. That is, as shown in FIG. 5(*a*), when the navigation system 3 is not operated, the report information such as "DVD/ON PLAYING BACK" is displayed by superimposition on the upper portion of the image plane 8*a* of the blue back display. When the navigation system 3 is operated, the report information such as "DVD/ON PLAYING BACK" is displayed by superimposition on the upper portion of the image plane 8*a* on which the map information is displayed.

Accordingly, even when the image display of the DVD is inhibited according to the travel regulation, by superimposition displaying the report information in which the playback operation of the DVD reproducing apparatus 2 is continued, the operation state of the DVD reproducing apparatus 2 can be informed to the driver, or the like.

Next, it is judged whether the "still control data", which is previously edited by the DVD producer, is played back or not (step S122). That is, it is judged whether the temporary still control data or the fixed still control data is played back or not.

When these "still control data" are detected, in step S124, the OSD display circuit in the image forming circuit 14 conducts the superimposition display in order to report that the still image is played back, on a portion of the image plane 8*a* of the display device 8, as shown in FIG. 5(*b*), and continues the play back operation again from step S110.

That is, in the case where travelling is not regulated, when the "still control data" is recorded, being included in the program chain information, the still image which is intended by the DVD producer, is displayed, however, because the travelling is regulated, the superimposition display of "DVD/ON STILL IMAGE" is conducted, as shown in FIG. 5(*b*). Incidentally, when the navigation system 3 is not operated, the superimposition display of "DVD/ON STILL IMAGE" is displayed by being superimposed on the blue back display, and when the navigation system 3 is operated, the superimposition display of "DVD/ON STILL IMAGE" is displayed by being superimposed on the map information.

As described above, by conducting superimposition display of "DVD/ON STILL IMAGE", the operation state of the present time of the DVD play back apparatus 2 can be informed to the driver, or the like.

In step S122, the "still control data" is not detected, the sequence is moved to step S126, and it is judged whether the "stop command data", which is previously edited by the DVD producer, is played back or not. When the "stop command data" is not detected (the case of "NO"), the sequence returns to step S110, and when the "stop command data" is detected (the case of "YES"), the sequence moves to step S128.

In step S128, the playback operation of the DVD reproducing apparatus 2 is stopped. Next, in step S130, as shown in FIG. 5(*c*), the superimposition display of "DVD/STOPPED" is displayed on a portion of the image plane 8*a* of the display device 8, and although not shown in the drawing, the OSD operation button is displayed on a lower area of the image plane 8*a* in order to demand the next operation of the operator. Then, in step S132, the above display is continued until the OSD display of the play back button is operated, and when the play back button is pressed, the superimposition display of "DVD/STOPPED" is turned off, and the sequence moves to S110.

As described above, when the superimposition display of "DVD/STOPPED" is displayed, the stopped state of the DVD reproducing apparatus 2 stopped according to the intention of the producer can be informed to the driver, or the like.

Figure 6:
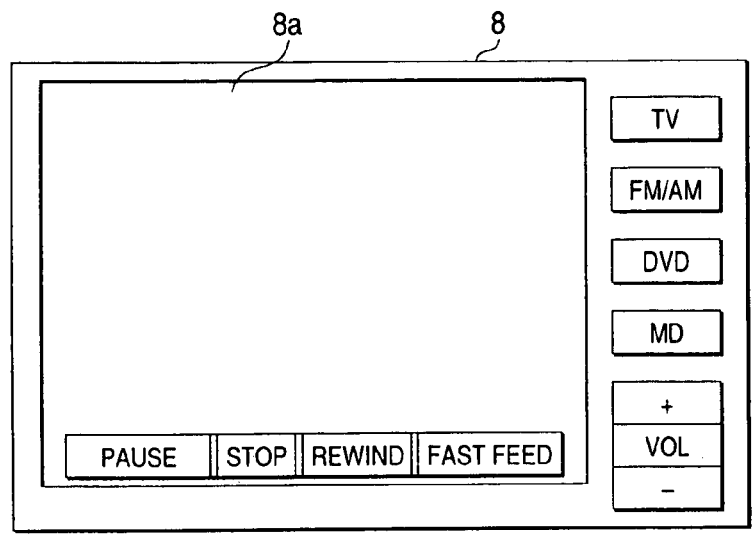
FIGS. 6(*a*) to 6(*c*) are illustrations showing the content of an OSD operation button display displayed on the display device during the car stop.
Figure 6:
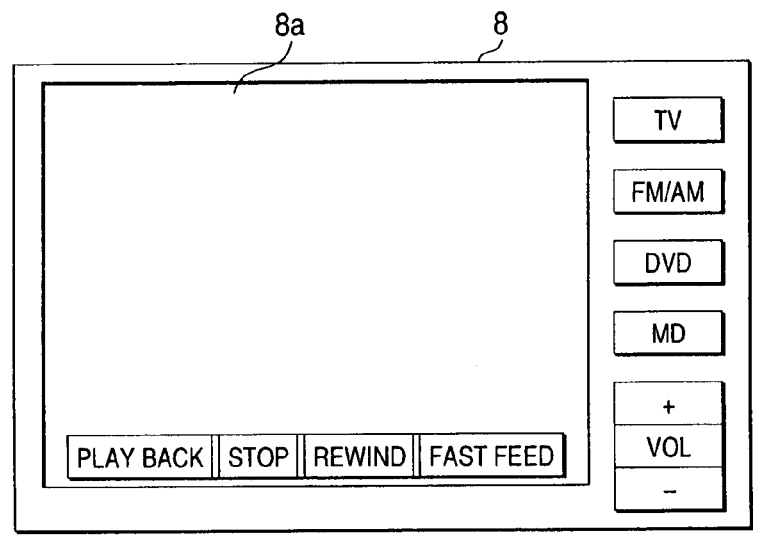
Figure 6:
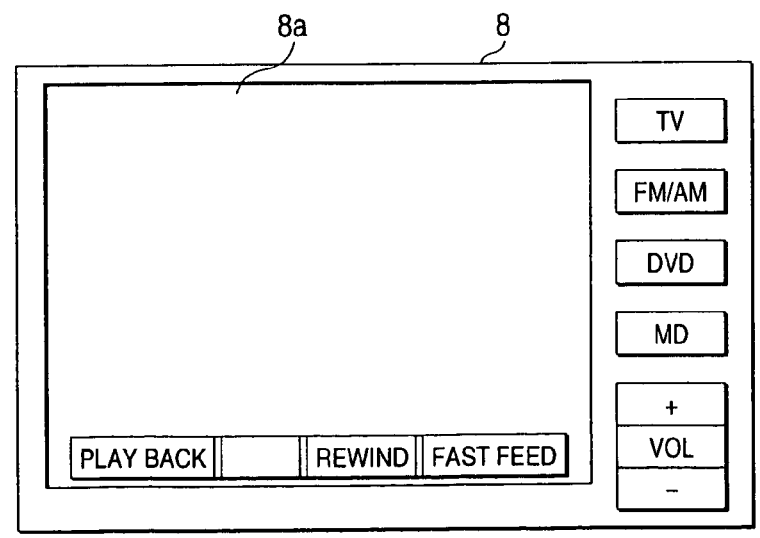

Next, in step S112 described above, when the car is stopped, the sequence moves to step S200 in FIG. 4, and as shown in FIG. 6(*a*), the OSD operation button is displayed on the lower portion of the image plane 8*a* of the display device 8.

That is, in this case, because the DVD reproducing apparatus 2 is played back, the played back image of the DVD is displayed on the image plane 8*a* of the display device 8, and further, the OSD operation button by which the driver, or the like, conducts a desired operation, is displayed. Further, because the DVD reproducing apparatus 2 is played back, the button to conduct the "PLAY BACK" is not displayed, and as the button display by which the next operation can be conducted, "PAUSE", "STOP", "REWIND", and "FAST FEED" are displayed.

Next, in step S202, the still image display which is intended by the producer, is conducted, and corresponding to that, when the "still control data" is detected, the sequence moves to the processing of steps S204 to S208. Further, when the "still control data" is not detected, the sequence moves to step S210.

When the sequence moves to step S204, as shown in FIG. 6(*b*), the OSD display showing that the still image is played back, is conducted. That is, as the button display by which the next operation can be conducted, "PLAY BACK", "STOP", "REWIND", and "FAST FEED" are displayed.

Next, in step S206, it is judged whether the mode of still image play back period which is intended by the producer, is completed or not, and when the still image play back mode is completed (the case of "YES"), the sequence returns to the moving picture play back, and moves to step S210. When the still image play back mode is not completed, the sequence moves to step S208, and it is judged whether the OSD display button of "PLAY BACK" is operated (touched) by the driver, or the like, or not, and when this operation is conducted (the case of "YES"), the sequence turns moving picture play back mode on and moves to step S210, and when the operation is not conducted (the case of "NO"), the sequence repeats the processing from step S206.

As described above, when the OSD operation button display is conducted in the still image play back period which is intended by the producer, the information that it is in the still image play back period which is intended by the producer can be provided to the driver, or the like, and when the OSD operation button of "PLAY BACK" is operated, the information that the still image mode is compulsively released, and the next play back start can be directed, can be provided.

Next, in step 210, it is judged whether or not "stop command data" is detected. Herein, when the "stop command data" is detected, the sequence moves to the processing of steps S212 to S218. Further, when the "stop command data" is not detected, the sequence moves to step S220.

When the sequence moves to step S212, as a result in which the play back operation of the DVD reproducing apparatus 2 is stopped, the play back image is not displayed on the image plane 8*a* of the display device 8. Then, in step S214, the OSD operation button as shown in FIG. 6(*c*) is displayed. That is, because the play back operation of the DVD reproducing apparatus is stopped, the OSD display button of "STOP" is not displayed, and as the button display which can be operated next by the driver, or the like, the button display of "PLAY BACK", "REWIND", and "FAST FEED" is conducted.

Next, in step S216, the sequence stands by until the OSD operation button of "PLAY BACK" is operated by the driver, or the like, and when the OSD operation button of "PLAY BACK" is operated, the sequence moves to step S218, and makes the DVD reproducing apparatus 2 start the DVD play back operation, and moves to step S220.

In step S220, it is judged whether the stop button provided in the remote controller, not shown, (the operation button to stop the play back operation of the DVD reproducing apparatus 2) is operated or not When this stop button is operated (the case of a "YES"), the sequence moves to the processing from step S212, and when the stop button is not operated (the case of "NO"), the sequence moves to step S110 in FIG. 3, and continues the play back operation.

Incidentally, in step S220, when the stop button is operated (the case of "YES"), the sequence does not move to step S212, and may directly stop the play back operation of the DVD reproducing apparatus 2.

As described above, according to the information reproducing apparatus for use in the car of the present embodiment, even when the image display is not conducted on the display device 8 for the travel regulation, because the operation state of the present time in which the DVD reproducing apparatus 2 is operated according to the control data previously recorded in the information medium, is displayed in the display form of the superimposition display, the appropriate information can be provided to the driver, or the like.

Further, when the DVD in which the "initial play back data" is previously recorded, is inserted in the DVD reproducing apparatus 2, the play back operation is automatically started, and when the DVD in which the "initial play back data" is not recorded, is inserted in the DVD reproducing apparatus 2, because the OSD operation button display to demand the "PLAY BACK" operation is conducted to the driver, or the like, the OSD operation button display can be conducted only when necessary. That is, when the display operation is automatically conducted, because the operation by the driver, or the like, is not necessary, the OSD operation button display to demand the "PLAY BACK" operation is not conducted, and when it is necessary that the direction of the play back start is manually conducted, because the OSD operation button display to demand the "PLAY BACK" operation is conducted, the rational OSD display can be conducted.

Further, when the DVD in which the "still control data" or the "stop command data" that was previously recorded, is played back, even when the travel is regulated, because the OSD operation button display corresponding to those control data is conducted, the facilities can be increased for the driver or the like.

Incidentally, in the present embodiment, when each control data is detected, the OSD display is conducted on the display device 8, and thereby, it is visually reported to the driver, or the like, however, the present invention is not limited to this, but it may be reported by sounding the effective sound by the audio output circuit 13 and the speaker 9. Further, the audio synthesizing circuit is housed in the audio output circuit 13, and the report may be conducted by the synthesized audio.

Further, the structure which can be systemized-up by combining the above apparatus 2 to 6, is described, however, the structure which is integrated by previously combining the predetermined apparatus from the apparatus 2 to 6, may also be allowable. Further, the structure in which the display device 8 is detachably connected to the control system 7, or the structure in which the control system 7 and the display device 8 are previously integrated, may also be allowable.

Further, as the embodiment, the information reproducing apparatus for use in the car is described, however, the present invention is not limited to such a purpose of use, but can be applied to each kind of electronic imaging device. For example, the present invention can be applied to the personal computer described as the problem of the conventional technology, or the electronic imaging device connected to the personal computer or the home electronic equipments.

As described above, according to the present invention, because, when the control information is detected during the play back of the information medium, the image information is played back and controlled in the display mode according to the control information, and the play back control state is reported, thereby, even when the image information is not displayed, the play back control state can be informed to the users at so-called real time.

As a result, when the image information is play back displayed according to the control information in which the image information is previously edited by the producer of the information medium to interactively edit the image information, by informing the play back control state to users at so-called real time, the effective information can be provided.

Further, the detection means for detecting whether the car is stopped or not, is provided in the control means, and because the structure by which, when the detection means detects the state during travelling of the car, the play back display of the image information is inhibited, and the play back control state is reported, is adopted, thereby, during the car travelling, by inhibiting the play back display of the image information played back from the information medium, the safety driving of the driver can be secured. Further, even when the play back display of the image information is inhibited, because the play back control state is reported, the play back control state can be reported to the driver, or the like, at so-called real time, without any trouble to the driving. As a result, when the image information is inhibited, the situation in which the driver, or the like, can not judge how to cope with it, can be avoided, and the effective information can be provided to the driver, or the like.

What is claimed is:

1. An information reproducing apparatus which plays back an information medium in which at least image information and control information to control a play back form of the image information are recorded, comprising:
    a detector that detects whether a vehicle is stopped;
    a controller that plays back and controls the image information in a display form according to the control information, and that reports the play back control state, when the control information is detected at the time of play back of the information medium,
    wherein the controller stops the play back of the image information and reports the play back control state, when the detected control information is information to stop the playback;
    wherein the image reproducing apparatus continues to reproduce the image information, and the controller, in response to the detector detecting that the vehicle is not stopped, inhibits display of the image information and reports a status of the image information to a driver or a passenger of the vehicle, when the detector detects that the vehicle is not stopped.

2. An information reproducing apparatus which plays back an information medium in which at least image information and control information to control a play back form of the image information are recorded, comprising:
    a detector that detects whether a vehicle is stopped, a controller that plays back and controls the image information in a display form according to the control information, and that reports the play back control state, when the control information is detected at the time of play back of the information medium, wherein the controller is provided with a memory for previously storing report data to report the playback control state, and to report according to the report data corresponding to the control information;

wherein the image reproducing apparatus continues to reproduce the image information, and the controller inhibits display of the image information and reports, according to the report data, a status of the image information, when the detector detects that the vehicle is not stopped, and wherein the report data comprises image data for informing an occupant of the vehicle of the play back control state of the information reproducing apparatus in accordance with the control information.

3. The information reproducing apparatus according to claim 1 or 2, wherein the control information has at least any one piece of information of play back stop, still image play back, and automatic play back start of the image information.

4. The information reproducing apparatus according to any one of claim 1 or 3, wherein the status of the image information is displayed in a display form of a superimposition display.

5. The information reproducing apparatus according to any one of claim 1 or 3, wherein the information reproducing apparatus is provided with a reproduction device and speed detector operable to detect the present speed of the vehicle, and when the detector detects that the vehicle is not stopped, the information reproducing apparatus displays and controls the information of the speed detector, and reports the play back control state.

* * * * *